United States Patent [19]

Katsuki et al.

[11] Patent Number: 5,581,767
[45] Date of Patent: Dec. 3, 1996

[54] BUS STRUCTURE FOR MULTIPROCESSOR SYSTEM HAVING SEPARATED PROCESSOR SECTION AND CONTROL/MEMORY SECTION

[75] Inventors: Kazuo Katsuki, Hyogo, Japan; Donald J. Sauer, Allentown; Danny Chin, Princeton Junction, both of N.J.

[73] Assignee: Nippon Sheet Glass Co., Ltd., Japan

[21] Appl. No.: 345,536

[22] Filed: Nov. 28, 1994

Related U.S. Application Data

[63] Continuation of Ser. No. 78,758, Jun. 16, 1993, abandoned.

[51] Int. Cl.$^6$ .............................. G06F 15/76; G06F 13/40
[52] U.S. Cl. .......................................... 395/800; 395/311
[58] Field of Search ........................................ 395/800, 311, 395/306, 308

[56] References Cited

U.S. PATENT DOCUMENTS

| | | | |
|---|---|---|---|
| 4,622,632 | 11/1986 | Tanimoto et al. | 395/800 |
| 4,720,780 | 1/1988 | Dolecek | 395/800 |
| 4,811,214 | 3/1989 | Nosenchuck et al. | 395/800 |
| 4,855,903 | 8/1989 | Carleton et al. | 395/325 |
| 4,910,669 | 3/1990 | Gorin et al. | 395/800 |
| 4,964,032 | 10/1990 | Smith | 395/800 |
| 5,038,386 | 8/1991 | Li | 395/800 |
| 5,138,695 | 8/1992 | Means et al. | 395/27 |

OTHER PUBLICATIONS

R. K. Scannell and J. K. Haage, "Development of a Multi-chip Module DSP", *IEEE Computer*, pp. 31–21 (Apr. 1993).
W. Daum, et al., "Overlay High Density Interconnect: A Chips–First Multipchip Module Technology," *IEEE Computer*, pp. 23–29 (Apr. 1993).
Claus M. Habiger, "Hybrid–WSI: A Massively Parallel Computing Technology?", *IEEE Computer*, pp. 50–61 (Apr. 1993).

*Primary Examiner*—Richard L. Ellis
*Attorney, Agent, or Firm*—Ratner & Prestia

[57] ABSTRACT

The processor section comprises a matrix-line layout of processor units; each processor unit combined with adjacent processor units in row and column direction by means of IPC buses, which are two-way buses. The control/memory section comprises arrays of control/memory units corresponding one-to-one to the processor units; each control/memory unit entering instructions and data simultaneously to the corresponding units in the processor section via optical channels to carry out arithmetic operations. By providing grid-like buses on the control/memory-unit arrays, and transferring instructions and data on the buses and sending them to the processor unit corresponding one-to-one to the control/memory unit to which data are transferred via optical channels, the transfer of instructions and data is carried out efficiently between processor units beyond the third closest ones.

14 Claims, 13 Drawing Sheets

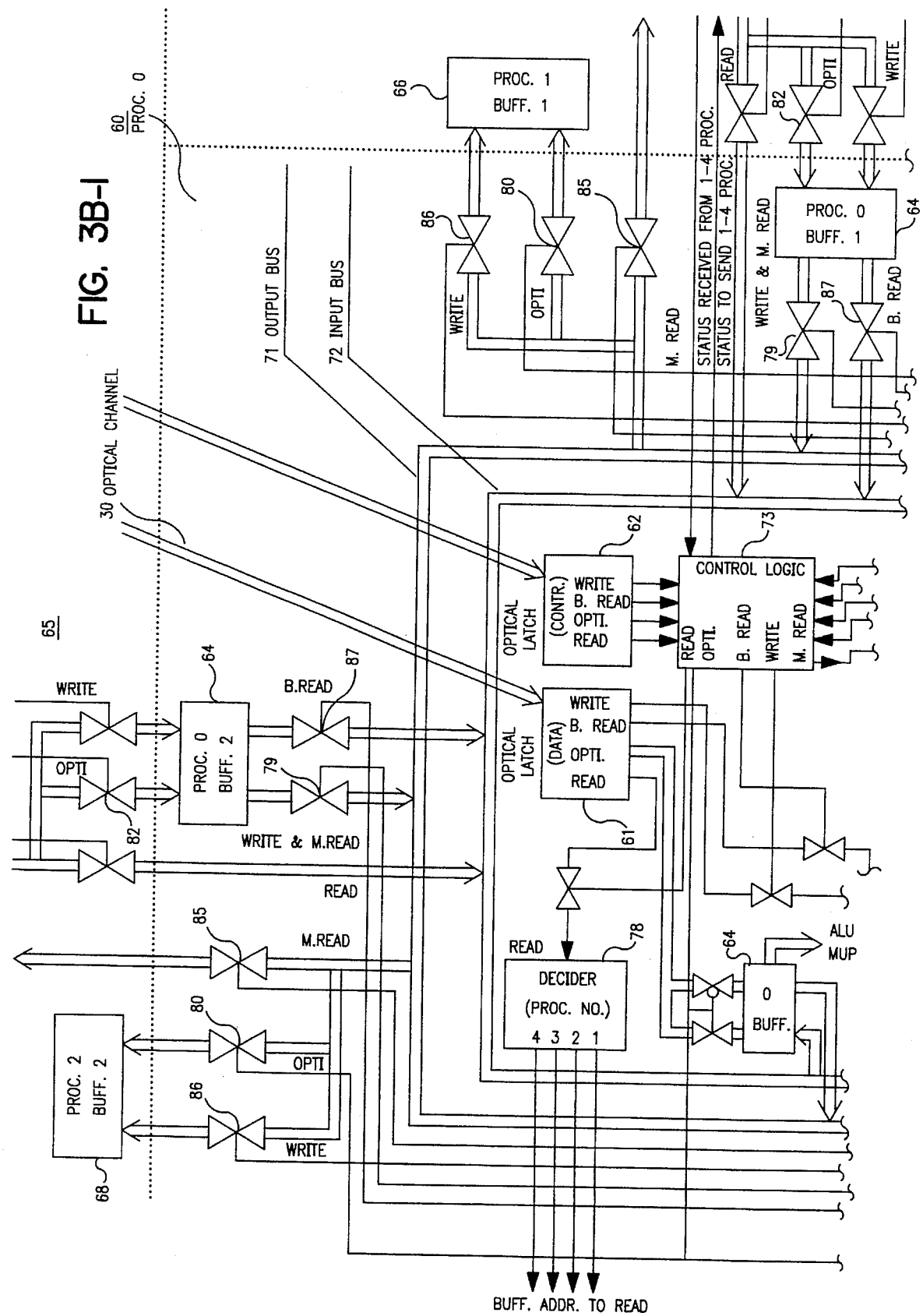

BUS STRUCTURE FOR MULTIPROCESSOR SYSTEM HAVING SEPARATED PROCESSOR SECTION AND CONTROL/MEMORY SECTION

This application is a continuation of application Ser. No. 08/078,758 filed Jun. 16, 1993 now abandoned.

BACKGROUND OF THE INVENTION

1. Field of the Invention

This invention relates array processor systems and in particular to a new bus structure which interconnects elements of a control/memory section and elements of a processor section.

The processing speed of dataprocessors has been increasing at an astounding pace in recent years, and the demand for higher-speed processors is growing accordingly. Efforts to meet this demand have been concentrated not only on manufacturing higher-speed integrated circuits (ICs) but also on improving processor architectures. Increasing processing speed by improving individual processor architectures, however, seems to approach its own limits. More recently, the need for higher processing speed is being met by providing parallel processing systems. The performance of these systems depends upon the effectiveness of communication among processors. In many currently available systems, interprocessor communication relies upon complex interboard wiring through which many signals are conveyed among the processors. Such wiring tends to increase the cost of the processors. To cope with this problem, attempts have been made to construct an architecture (e.g. multi-chip module—MCM) that divides functions within a processor. These attempts, however, have not yet reached commercial usefulness.

The present applicant and others have proposed a processor architecture which incorporates the concept of MCM in their patent application, Ser. No. 07/857,626 filed on Mar. 26, 1992, under the title of "PARALLEL DIGITAL PROCESSING SYSTEM USING OPTICAL INTERCONNECTION." In this proposed architecture, the processor section is separated from the control/memory section. Effective interconnection among the processor units in this architecture is simplified because a group of processor units is arranged in an array on a single chip. A large number of control/memory chips, that are separated from processor chips, may be independently interconnected on a separate circuit board.

2. Description of the Prior Art

The interconnecting bus for a parallel processor system is inseparable from the parallel-processing mechanism. Parallel-processing mechanisms can be classified in terms of their constituent multiprocessors, as either a closely-connected mesh system or a sparsely-connected tree system. In addition, there is a reconfiguration system classification in which connections can be varied freely in accordance with problems to be solved. The inter-processor connecting system for structuring each of these parallel processing mechanisms may be classified as being either a direct connection system or an indirect connection system.

In the direct connection system, processors which are arranged in mesh or hierarchy are directly connected to each other. Communications among processors that are not directly connected to each other are relayed by intervening processors. In the indirect connection system, switches are closed for interconnection whenever processing elements are needed. Bus interconnection falls into this classification, and is of a non-hierarchical structure. To execute processing, however, a hierarchical method is often imposed on the bus communication function.

By this hierarchical method, the function of bus management is assigned to one of the processors, or to a special-purpose processor (arbiter), with the processing functions assigned to the remaining processors. The bus interconnection communications method includes not only multiprocessors, but also LANs using ring buses to implement parallel-processing mechanisms, such as torus-connected networks, and hypercube-connected processor networks.

When classifying the types of circuit interconnection, there are bus interconnection, multi-bus interconnection, multi-port memory interconnection and channel interconnection. In bus interconnection, multiple processing elements are connected to a single bus, and connection is effected between arbitrary processing elements through the arbitration of the bus arbiter. In multi-bus interconnection, multiple sets of connections between processing elements are formed simultaneously by a plurality of buses. In multi-port memory interconnection, multiple processor elements and multi-port memories as processing elements are connected to each other; each memory may be accessed by a plurality of processor elements. Channel interconnection involves connecting processor elements to other processor elements the same manner as with input/output units; the connected processor elements are used exclusively for their specific purposes. This connection, however, requires one channel to connect one processor element, and so precludes connections among a large number of processors.

The following is a description of an exemplary bus interconnection structure and an exemplary directly connected mesh structure, both of which are closely related to this invention. Desirable functions for the bus structure include not only a high-speed data transfer capability but also a high-speed arbitration function. A block transfer function and the ability to broadcast memory data are also desirable. While a single bus is disadvantageous in terms of fault tolerance, multiple buses tend to involve complex control mechanisms. For this reason, a single bus architecture is more often adopted. For example, 32-bit wide buses are frequently employed for both data and address buses to match the bit width of the ALU (arithmetic and logic unit) used by the processors. In some cases, 64-bit data buses are employed to improve data transfer capacity.

Synchronization mechanisms for data transfer operations are divided into synchronous bus and asynchronous bus systems. In a synchronous bus system, the bus controllers for all processors are operated in synchronism with the same clock. This system has advantages in that it uses relatively simple hardware, and is capable of high-speed transfer. In practice, however, high-speed transfer is difficult to implement with this system because of the occurrence of clock skew among the processors. Data transfer speed is lost when the synchronization of operations must compensate for the skewed clock.

In an asynchronous bus system, on the other hand, data are transferred using dedicated synchronization signal lines, i.e., strobe and acknowledge lines. In this system, the transmit side provides addresses and data to the bus, and then sends a message, on the strobe line, to the receive side. Upon receipt of the data, the receive side sends a message, via the acknowledge line, acknowledging the receipt, to the transmit side. Upon receipt of the acknowledge message, the transmit side returns to its initial state, as recognized by the receive side, and also returns the acknowledge line to its initial state. This system is called the two-wire handshake. To transfer data to multiple receive sides, three-wire handshaking is employed by using another acknowledge wire. While the asynchronous system eliminates the need for a common clock as with the synchronous system, its transfer rate is slowed due to the handshaking.

The arbitration mechanism is divided into a centralized system in which processors are controlled centrally at one location, and a distributed system in which control functions are distributed among processors. In a centralized system, each processor presents a request to the arbiter and receives a reply from the arbiter. Consequently, this system requires as many request lines as there are processors. In an alternative system of this type, a single bus is used and the time which each processor may use is determined in advance by time-division multiplexing the bus itself. Centralized systems are suitable only for relatively small numbers of processors because their packaging design becomes complex with increasing numbers of processors.

One exemplary distributed system cascade connects the processors in a daisy-chain configuration. The right to use the bus is checked in the priority order of processors. Once the processor having the highest priority obtains the right to use the bus, that fact is conveyed to the lower-priority processors. While the daisy-chain connection system is simple in construction, it requires decision-making time proportional to the number of processors.

Another exemplary method is that used, for example, by Futurebus. This method assigns each processor which needs to access the bus its own priority/identification number, expressed in binary digits. These priority numbers are applied to an open collector bus when a logic-low level is applied to any one of the open collectors, the corresponding bit line also becomes a logic-low level. An open collector bus arbitration system selects the bus requestor which has a bit width required to express all of the processor numbers in binary digits, and a which has the same identification/arbitration number as is expressed in the multiple lines which the bus arbitration system uses to decide the right to access the bus.

In this circuit, winners are decided in order of higher identification/arbitration numbers, and losers become unable to output logic-low levels to the lower-level buses. In Futurebus, therefore, a remedy for lower-level processors is adopted by implementing the decision-making process as a high-speed operation. In this system, each arbitration operation occurs in an amount of time equal to the total delay time of the buses. This method is being employed in systems other than Futurebus, for example Multibus-II (Intel) and Nubus (Texas Instruments). Advantages of Futurebus compared with the conventional buses are as follows.

1) It is a perfect asynchronous bus.
2) Addresses and data are transferred on a time-multiplex basis on 32-bit lines.
3) All lines are open collectors, on which arbitration is implemented.
4) Emphasis is placed on the block transfer and broadcasting of data.
5) Consideration is given to fault tolerance.

In this category of the direct connection structures, there are a number of interconnection systems which have been designed to meet specific applications. Depending on the layout of processors, there are a wide variety of connection methods, such as linear interconnection, ring interconnection, grid interconnection. As a variation of the grid interconnection, there is torus interconnection. In addition, there is a tree interconnection, suitable for hierarchical structure, and a hypercube interconnection, which takes advantage of communications lines having a uniform length. When processors are placed on nodes of these circuit networks, their branches become connecting circuits. The performance of a circuit network is determined by how many communication paths connecting two processors can be used simultaneously and by the number of relays that are needed on a particular communication path. A communications path which requires a large number of relays is much slower than one which uses a smaller number of relays. The number of relays may be reduced by increasing the number of circuit networks. Increasing the number of networks, however, has its limitation in terms of cost. General requirements for circuit-connected networks are as follows:

1) The number of connecting circuits is desirably small.
2) The number of relays is desirably small.
3) The number of communication paths which may be used simultaneously is desirably large.
4) Connecting circuits should not intersect with each other wherever practicable.

Some of these requirements conflict with other ones of requirements, and there are no connecting networks that satisfy all these requirements.

Connecting circuits include, for example, buses, channels, communication memories, FIFO buffers and switching circuits. These connecting circuits are further divided into dedicated connecting circuits used by only two processor elements, and shared connecting circuits used by three or more processor elements. Besides these, there is a system where a dedicated circuit is used in common by processor elements which may change the circuit by switches. The data transmitted to connecting circuits are normally bit-parallel data. In some cases, however, bit-serial data may be transmitted.

Dedicated connecting circuits are generally used for normal direct connection networks. These circuits are typically channels, communication memories and/or FIFO buffers. Shared connecting circuits include buses and multi-port memories. By alternately arranging 4-port memories and processor elements on a plane, a torus-connected network can be formed. Furthermore, a mesh-connected network having a two-dimensional configuration of $m^2$ units of processor elements can be implemented by using 2 m bus pieces. An octuple grid connecting network can also be formed.

In synchronous communications, data are transferred by synchronizing the transmit side with the receive side. As a result, one pair of processor/memory elements has to wait so long as the other pair is busy. This waiting time is called the synchronization time during which processors are kept idle. This synchronization time tends to reduce, the efficiency of the parallel processor system. If synchronous communication occurs in a network having a relatively large number of relays, synchronization time must be provided at every relay, leading to increased communication time. One of the advantages of the synchronous system, however, is that blocks of data may be transferred irrespective of their size. Thus, the amount of data to be transferred at any one time is not limited by the size of buffers.

The asynchronous system, on the other hand, has buffers of a size sufficient for store data once. The transmit side writes data into the buffer and the receive side reads data from the buffer. Consequently, data transaction can be executed even when one of the processors is busy. In terms of data transfer rate, since the buffers are accessed twice in the asynchronous system, the asynchronous system takes more time, compared with the synchronous system. Dual-port memories may be used in a time-sharing mode as the buffers. Alternatively, simple FIFO buffers may be used in the same way. To implement two-way communication, separate buffers are provided for data transmission and reception.

Even when buses or channels are used, asynchronous communication can be facilitated by providing buffers for processor elements on both the transmit and receive sides, and transferring data using processor interrupts. This system has slightly lower efficiency compared with a connecting circuit that has buffers because, to be effective, processors desirably spend much of their time managing the buffers. Nonetheless, in some applications, asynchronous systems can achieve more efficient communications than synchronous systems.

Since a mesh connection system generally involves a large number of connecting circuits, it is generally used only in large-scale multi-processor systems. This poses a problem in terms of cost. For this reason, this type of system may use a series transmission circuit which has fewer transmission lines but which sacrifices communication speed.

It is an object of this invention to provide a bus structure for multiprocessor systems of a type in which the processor section and the control/memory section are separated from each other.

It is another object of this invention to provide more efficient bus structure suitable for image processing.

SUMMARY OF THE INVENTION

This invention is embodied in a bus structure for multi-processor systems comprising a processor section having a plurality of processor-unit arrays, and a control/memory section having a plurality of control/memory-unit arrays corresponding one-to-one to the aforementioned processor units; corresponding processor units and the control/memory units are interconnected by optical means. The bus architecture of this invention includes a dual bus structure comprising a first instruction/data transfer bus provided in the processor section, a second instruction/data transfer bus provided in the control/memory section, and an output channel feeding output values from the processor section back to the control/memory section; the first instruction/data transfer bus and the second instruction/data transfer bus have complementary bus properties.

That is to say, the first instruction/data transfer bus has a bus structure which directly connects each processor unit to its adjacent processor units, while the second instruction/data transfer bus has a bus structure which connects the control/memory units into a grid form using row buses and column buses.

The first instruction/data transfer bus provides for the transfer of instructions and data among only the adjoining processor units, whereas the second instruction/data transfer bus provides for the transfer of instructions and data among control/memory units beyond those corresponding to the aforementioned adjoining processor units.

The processor units directly connected by the first instruction/data transfer bus each have respective buffers; the input data values to a particular address in the buffer of a processor unit can be stored concurrently into a predetermined address in the buffer of the processor units which are adjacent to the aforementioned one processor unit.

The processor unit directly connected by the first instruction/data transfer bus can read the data at an arbitrary address in the buffer of each processor unit, and write data to a predetermined address.

The second instruction/data transfer bus can execute write, read, block write and block read operations for a plurality of control/memory-unit sets in the control/memory-unit arrays.

The second instruction/data transfer bus can transfer instructions and data from an instruction/data source, including a host computer, to all other control/memory units.

By forming processor unit, control/memory unit pairs in a one-to-one correspondence, and transferring instructions and data from an arbitrary control/memory unit to any other control/memory unit, the processor unit which forms a pair with the any control/memory unit can be accessed from any other processor unit.

The bus structure of this invention has a bus adjusting function through which the right to access the aforementioned row and column buses can be obtained with equal opportunity by all requestors.

The bus structure of this invention has an adjusting function to allow the information transferred by the aforementioned column buses to be switched to multiple intersecting row buses with equal priority.

The number of the aforementioned output channels is equal to the number of columns (rows) of the array of processor units. The output channels used to connect to the column buses of the array of control/memory-units are as many as the number of channels which are used to connect the processor units and the control/memory units in parallel via the column buses.

Furthermore, the bus structure of this invention acts to form pairs of processor units and control/memory units in a one-to-one correspondence. It also allows data provided by an arbitrary processor unit to be applied to the control/memory unit which forms a pair with another processor unit, and allows control to be transferred such that an arithmetic operation step is executed by the other processor unit.

DETAILED DESCRIPTION OF THE EXEMPLARY EMBODIMENTS OF THE INVENTION

The bus structure of this invention is applied to a processor, as proposed in the above-referenced U.S. patent application Ser. No. 07/857,626, in which a control/memory section and a processor section are physically separated and optically connected to each other.

Figure 1:
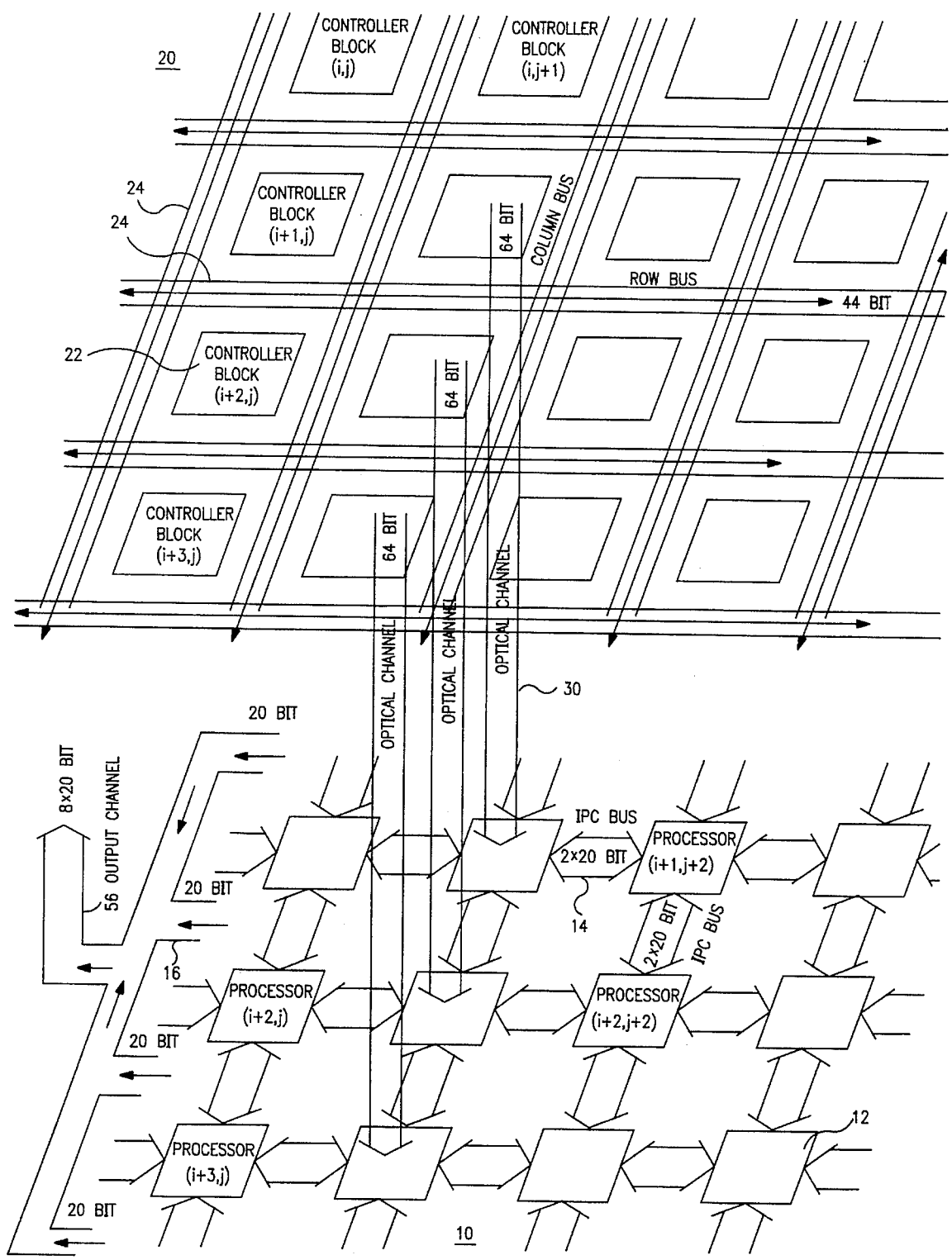
FIG. 1 is a block diagram illustrating a processor system which includes a bus structure according to the present invention.

FIG. 1 is a diagram which shows an exemplary bus structure according to the present invention. A processor section 10 consists of an eight-row by eight-column matrix array layout of processor units 12 (of which four rows and four columns are shown). In the exemplary embodiment, each processor unit is connected to two adjacent processor units in each of the row and column directions by IPC buses (inter-processor connection buses) 14. In the exemplary embodiment of the invention, these are two-way buses which include two parallel 20-bit buses. The output signals from the processor-unit array are transferred by 20-bit wide output buses 16, one for each row (or column). Thus, a of 160 bits of parallel output signals are provided by the processor chip 12.

A control/memory section 20, on the other hand, comprises an array of control/memory units 22 which are in a one-to-one correspondence with the processor units 12. Each control/memory unit 22 provides a 32-bit wide instruction value and two 16-bit wide data values simultaneously into its corresponding processor unit 12. These values are conveyed from the control/memory section 20 to the processor section 10 via an optical channel 30 to cause the processor unit 12 to execute arithmetic operations.

As described below, data transfer between processor units which are beyond the third nearest ones involves a relatively large number of relaying processor units, making the direct connection network of processors disadvantageous. Data transfer between the processor units beyond the third closest one is effected by providing 32-bit wide buses 24 on the arrays of the control/memory units 22. Thus, the transfer of instructions and data is efficiently accomplished by transferring instructions and data from a source processor to its corresponding control/memory unit, then transferring the values between the source and destination control/memory units via these buses and then using the respective optical channel 30 to transfer the values to the destination processor unit 12 which corresponds to the destination control/memory unit 22. This type of flexible data transfer is enabled by the complementary nature of the busses which couple the processor units 12 on the one hand and the busses which couple the control/memory units on the other hand. While a direct/grid connection is shown for the two types of busses, other types of bus structures, such as those described above with reference to the prior art systems, are also contemplated. An important aspect of any such structure, however, is that a different and complementary communication method be used by the control/memory units than is used by the processor units.

The exemplary bus structure of this embodiment is a unique bus architecture for multiprocessors, which has a dual instruction/data transfer connecting network formed by arranging 32-bit buses 24 into a grid form in the unit arrays of the control/memory section 20, providing a direct connection network in the processor-unit arrays of the processor section 10, and connecting the units 22 of the control/memory section 20 to the units 12 of the processor section 10 with the optical channel 30.

Figure 2:
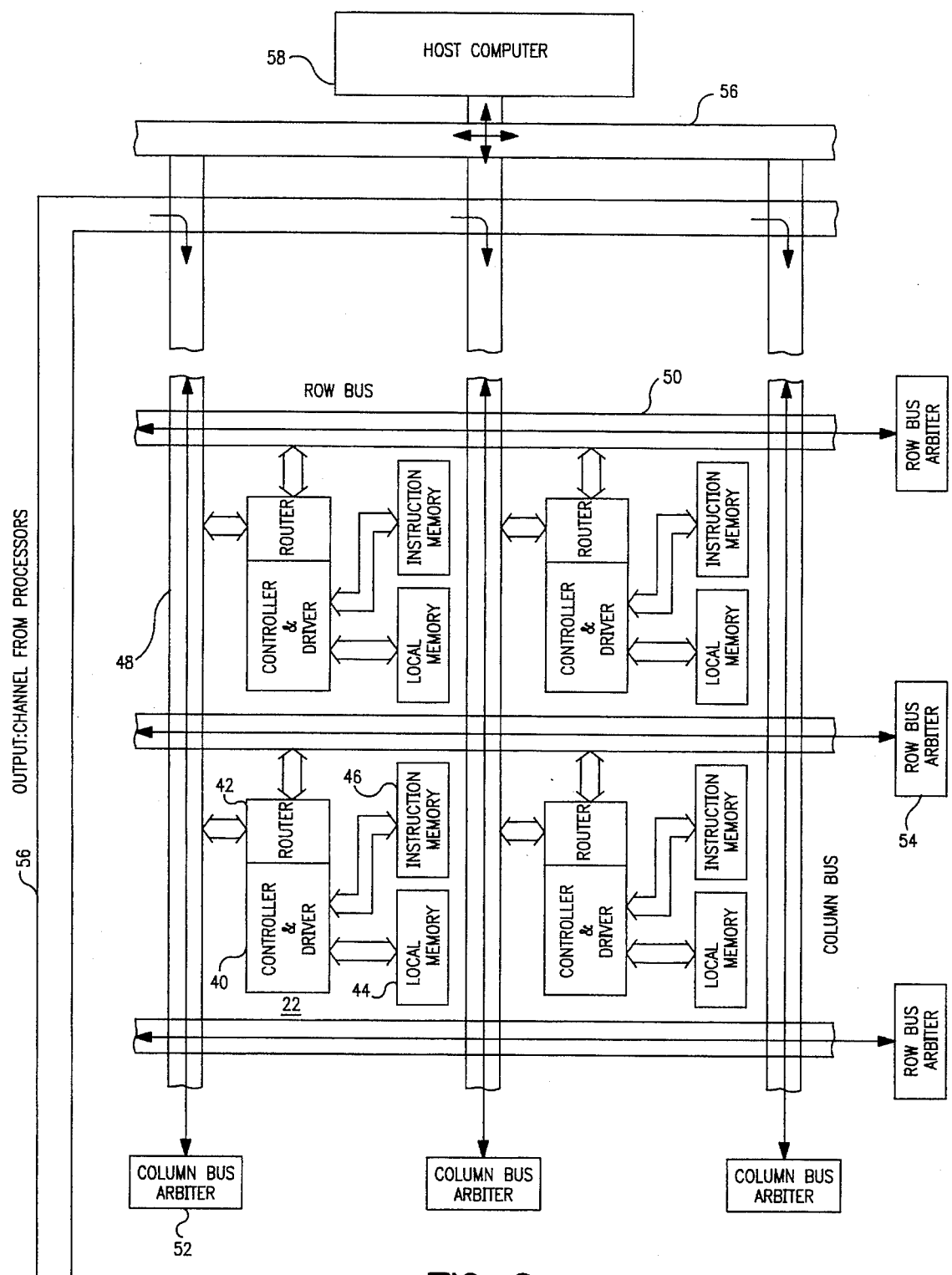
FIG. 2 is a block diagram illustrating the construction of a control/memory-unit array of the processor system shown in FIG. 1.

FIG. 2 is a diagram showing the functional structure of the control/memory-unit array 22 of the control/memory section 20. Each control/memory unit 22 comprises an integrated circuit consisting of a controller/driver (hereinafter referred to as a controller for short) 40 and a router 42, a local memory 44, and an instruction memory 46. Column buses 48 and row buses 50 are provided in a grid form in such a fashion as to enclose the control/memory units 22.

The driver portion of the controller/driver 40 drives light-emitting element arrays which form an optical channel. The router 42 transmits input/output instructions and data its associated controller/driver 40 or onto the buses 48 and 50. In addition, router 42 can read I/O instructions and data from the buses 48 and 50 and can switch instructions and data from the column bus 48 to the row bus 50 or vice-versa. The output data from a processor unit 12 of the processor section 10 are transferred to a predetermined control/memory section 22 via an output channel 56 and a column bus 48. Each of the column buses 48 and the row buses 50 has a respective arbiter 52 or 54, which controls access of the various control/memory sections 22 to the buses. The input/output channels 56 of the host computer 58 are also connected to the column buses 48 to transfer instructions and data from the main memory (not shown) of the host computer 58 to the local memory 44 and to the instruction memory 46 of each control/memory section.

The output channels 56 of the processor-unit arrays are as many as the number of columns (or rows) of the processor-unit array. These channels are provided in parallel, and are connected to the column buses 48 of the control/memory-unit arrays which correspond to the processor-unit arrays. Consequently, a plurality of output data values from the processors may be provided in parallel to the designated control/memory units 22 via the column buses 48. This means that as many output data values as there are columns in the matrix may be written simultaneously into the local memories 44 of respective ones of the control/memory sections 22.

Figure 3A:
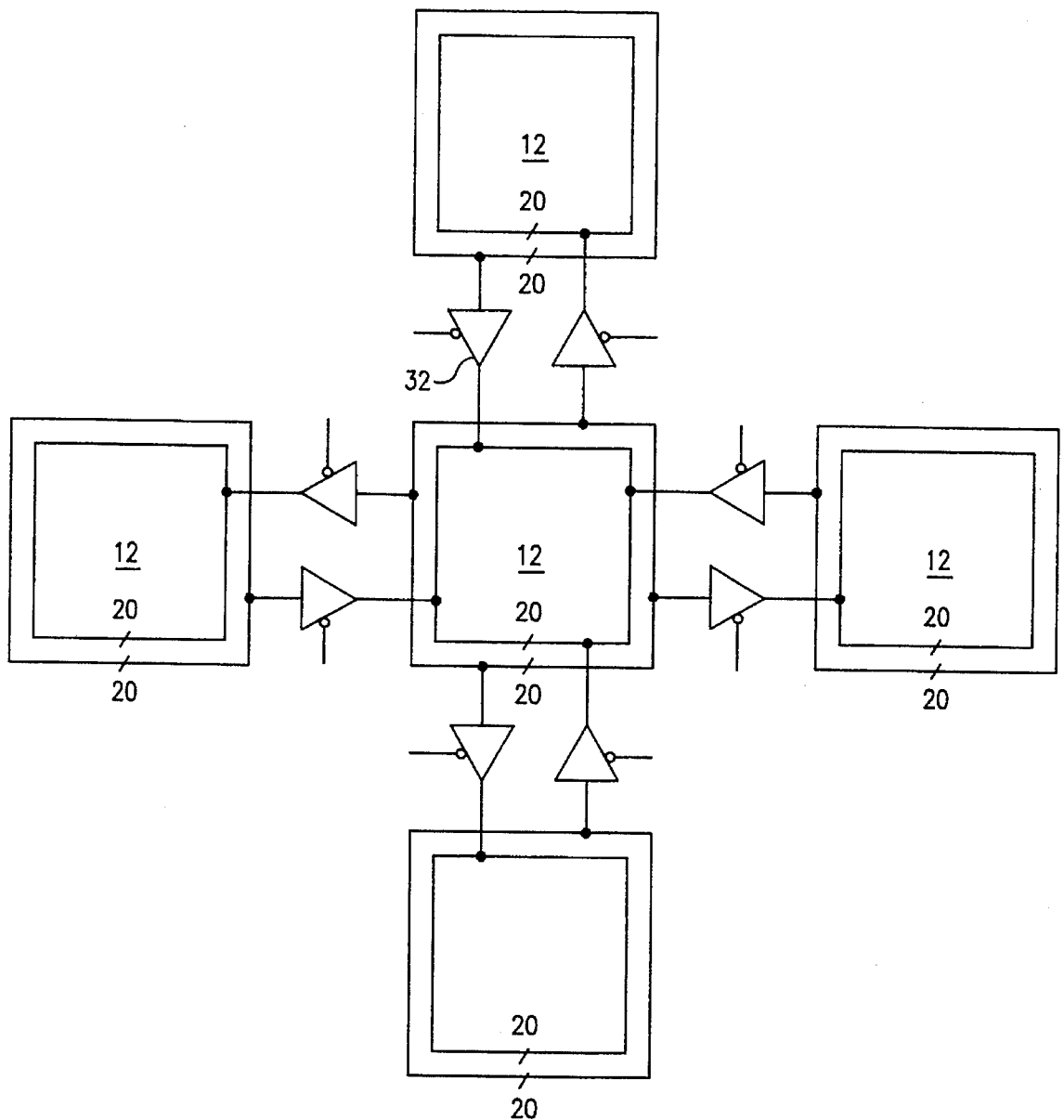
FIG. 3A is a block diagram, partly in logic diagram form, illustrating the outline of the IPC bus shown in FIG. 1.

FIG. 3A is a diagram illustrating the basic functional structure of the IPC buses 14 of the processor section 10. FIG. 3A shows IPC buses 14 connecting one central processor unit 12 to each of the adjacent processor units 12 in the row and column directions. As noted earlier, the IPC buses are two-way buses having a bit width of 20-bits by 2 arranged so as to enclose each processor unit. Between any two processor units 12, the buses are connected by output gates 32. These output gates correspond to the output gates 80 and 86, described below with reference to FIG. 3B.

Figures 2, 3B:
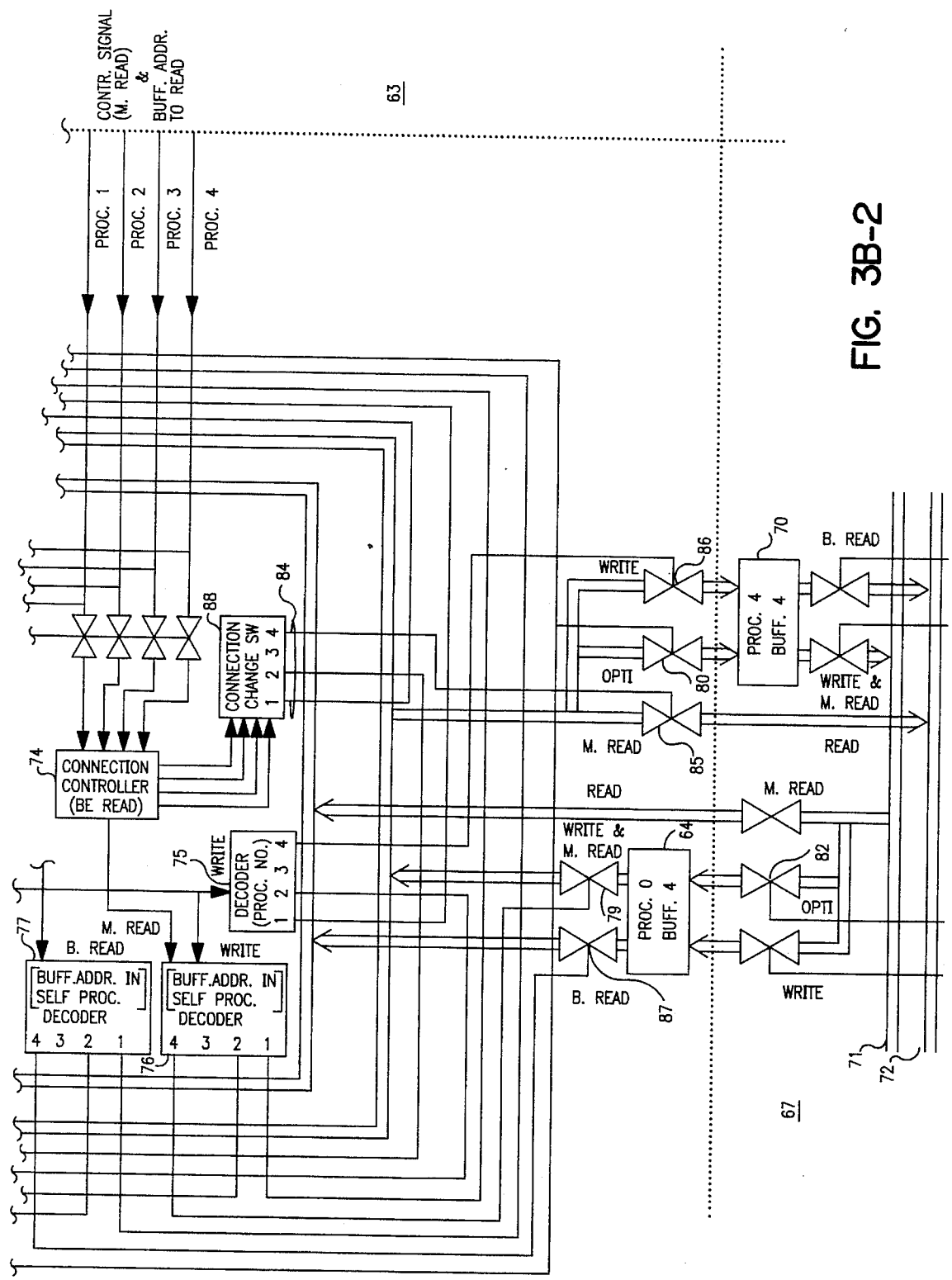
FIG. 3B is a block diagram, partly in logic diagram form, illustrating the adjacent processor unit and IPC buffer shown in FIGS. 1 and 3A.

FIG. 3B illustrates the portion of processor unit 12 associated with the transmission and receipt of data, parts of the four adjacent processor units 12 in row and column directions and a portion of the IPC buffers. This figure shows: a processor unit 60, part of a processor unit 63 adjacent to the processor unit 60 on the right side, part of a processor unit 65 adjacent to the processor unit 60 on the upper side and part of a processor unit 67 adjacent to the processor unit 60 on the lower side. The processor units adjacent to a processor unit in all directions are referred to here as the first closest processor units. Although only those IPC buses enclosing the processor unit 60 are shown in detail, the first closest processor units are also enclosed by identical buses.

One processor includes an A-channel optical latch 61 including light-receptor arrays (not shown) which receive 16-bit optical data signals (B-channel optical latch is not shown in the figure), and an optical latch 62 receiving 32-bit optical input instructions and control signals. Instructions and data from the controller 40 of the control/memory section 20 are input in parallel to each processor unit by the optical latches 61 and 62 by means of the optical channel 30.

Now, assume that the central processor unit (the processor unit 60 in FIG. 3B, for example) is numbered as No. 0, the processor unit 63 adjacent to it on the right side as No. 1, the processor unit 65 adjacent to it on the upper side as No. 2, the processor unit adjacent to it on the left side (not shown) as No. 3, and the processor unit 67 adjacent to it on the lower side as No. 4. That is, those processor units surrounding the central processor unit 60 are numbered as Nos. 1 through 4 counterclockwise. It is also assumed that these numbers are called the closest processor-unit numbers. Each processor unit has an IPC buffer having memory locations of addresses 0-4.

The IPC buffer for No. 0 processor unit is numeral 64, the IPC buffer for No. 1 processor unit is represented by numeral 66, the IPC buffer for No. 2 processing unit is numeral 68, and the IPC buffer for No. 4 processor unit is numeral 70, respectively. The IPC buffer for No. 3 processor unit is not shown in the figure. For the simplicity of the drawing, the IPC buffer 64 is shown for addresses 0, 1, 2 and 4, the IPC buffer 66 for address 1, the IPC buffer 68 for address 2, and the IPC 70 for address 4. Although each processor unit has an input gate group (79 and 87) and an output gate group (80, 85, 86), only the input gate group and the output gate group of Nos. 0 and 4 processor units, and the output gate group of Nos. 1 and 2 processor unit are shown in FIG. 3B.

To read addresses 0-4 in the IPC buffer 64, the address instructed by the optical latch (data) 61 through the optical channel 30 is sent to a decoder 77, the output signal from the decoder 77 accesses the corresponding gate 87 for addresses 1-4 in the IPC buffer 64. The data stored in address 1, 2, 3 or 4 in the IPC buffer 64 is output to address 0 of the buffer 64 via the input gate 87 and an input bus 72.

Address 0 in each IPC buffer is connected to the optical latch 61 of its own processor unit, and can be connected to the same address (1, 2, 3, or 4) as the adjacent processor-unit number in the IPC buffer of the respective first closest processor unit. This connection can be made via the output data bus 71 and, the four output gates 80 which are opened by a positive control signal via a control logic circuit 73, controlled by the optical latch (control) 62. Consequently, as data are input to the No. 0 processor unit shown in FIG. 3B, via the optical latch (data) 61, the data may be stored in address 0 in the IPC buffer 64 belonging to processor unit No. 0, stored in address 1 in the IPC buffer 66 belonging to the No. 1 first closest processor unit 63, stored in address 2 in the IPC buffer 68 belonging to the No. 2 closest processor unit 65, stored in address 3 in the IPC buffer belonging to the No. 3 closest processor unit (not shown), and stored in address 4 in the IPC buffer belonging to the No. 4 closest processor unit 67, respectively. Unless otherwise instructed by the optical latch (control) 62, each data value from the No. 0 processor unit is written into the corresponding addresses in the IPC buffers belonging to the adjacent four processor units Nos. 1–4. In the simplest instruction mode using the optical latch, a negative control signal via the optical latch 62 prohibits optical input data received via the optical latch 62 and the optical channel 30 from being transferred to the IPC buffers in the first closest processor units. This signal, however, still allows the optical input data to be stored in address 0 in the buffer 64.

The data in address 0 in the IPC buffer which is copied to each processor unit which is closest to the No. 0 processor unit on the right, upper, left and lower sides are written in addresses 1, 2, 3 and 4 in each IPC buffer via an output bus 71 and an output gate 82 of the processor unit that received the data. In FIG. 3B, the data in address 0 (not shown) in the IPC buffer 66 of No. 1 processor unit 63 are written in address 1 in the IPC buffer 64 of No. 0 processor unit 60; the data in address 0 (not shown) in the IPC buffer 68 of No. 2 processor unit 65 are written in address 2 in the IPC buffer 64 of No. 0 processor unit 60; the data in address 0 in the IPC buffer on No. 3 processor unit (not shown) are written in address 3 in the IPC buffer 64 of No. 0 processor unit 60; and the data in address 0 (not shown) in the IPC buffer 70 of No. 4 processor unit 67 are written in address 4 in the IPC buffer 64 of No. 0 processor unit 60. Consequently, each process unit receives not only the input data that it receives for itself but also the input data which is received by the four first closest processor units. The transfer of these data is executed in synchronism with the input data clock as described below.

Referring to FIG. 2, when a processor unit 60 reads the data in an address other than address 0 in the IPC buffer of one of the first closest processor units, the controller 40 for the processor unit 60 transmits the address in the IPC buffer which being read, responsive to an instruction from the optical latch 61, together with the closest processor unit number. Referring to FIG. 3B, the processor unit sends the received signal via a decoder 78 to the connection control circuit (be read) 74 in the designated processor unit. The connection control circuit 74 coordinates the received signal with requests from other processor units; inputs an address, expressed by two bits, to the decoder 76, which in turn opens the input gate 79 for the designated address in the IPC buffer; and applies the data to the output data bus 71.

The four gates 85 (the gate for No. 3 processor unit is not shown) which transmit data to the first closest processor unit are provided on the output data bus 71. All the gates are closed except the gate leading to the requesting processor unit. This is the processor unit to which data are to be transferred responsive to the instruction issued from the connection control circuit 74 via a connection change switch 88 the gate control signal line 84. The data are transmitted to the input data bus 72 of the requesting processor unit via the opened gate 85. The data transferred via the input data bus 72 are stored at address 0 in the IPC buffer.

As for the IPC buffer 70 of No. 4 processor unit, the data in addresses 1 and 3 are the data input to the processor unit (not shown) (hereinafter referred to as the second closest processor unit) which is located on the diagonal with respect to the processor unit 60, and the data in address 4 are the data input to the processor unit (not shown) (hereinafter referred to as the third closest processor unit) which is located one step lower than the second closest processor units with respect to the processor unit 60. In this way, by reading addresses 1–4 in the IPC buffer of the first closest processor units, the data of the second and third closest processor units can also be read.

Using these facilities, edge detection and differential operations, often Used for image processing and the numerical solution of differential equations, can be executed at high speed using the subject bus structure. That is, the status variables for the first closest sites are stored by all the processor units together with parallel input, and arithmetic operations involving the first closest sites can be executed by each processor unit independently and in parallel. Operations involving the second and third closest sites can also be executed at high speed by directly reading from the IPC buffer of the first closest sites. No relays are required for these transfers.

The processor units can also write data into IPC buffers of their first closest processors at addresses other than address 0. The optical latch 61 sends address in its own IPC buffer to be read for the write operation to the decoder 76, and the number of the destination processor unit (i.e. the processor unit to which the data is to be sent), to a decoder 75. After the state of the destination processor unit is checked by the control logic unit 73, the decoder 76 opens the gate 79 to send data in the IPC buffer 64 to the output bus 71. The decoder 75, on the other hand, closes all gates on the output data bus 71 other than the output gate 86 which connects data bus 71 to the selected destination processor unit and causes the data to be written at a predetermined address in its IPC buffer while corresponds to the destination processor. When No. 0 processor unit writes data in No. 4 processor unit, for example, the data are written in address 4 in the IPC buffer of No. 4 processor unit.

In this way, the reading and writing of data, that is, the transfer of data, is possible without relaying the data between processor units so long as the third closest processor units are concerned. Data transfer between the processor units beyond the third closest ones has to be executed by relaying control instructions, as in the case of a multiprocessor system having a mesh connection. It is well known that this method take much time in data transfer in proportion to the number of relays.

In this invention, therefore, data transfer between the processor units beyond the third closest ones is performed at high speed by using the buses of the control/memory section. Referring to FIG. 2. To this end, grid-like buses 48 and 50 are provided on the circuit board on which control/memory-unit array is mounted. This array includes control/router chips(40, 42) and instruction/data-memory chips (44, 46). The column and row buses are provided primarily to transfer instructions and data to processor units which are beyond the third closest ones. The buses transfer instructions and data by multiplexing them over a 40-bit bus width.

The buses have data/address strobe and acknowledge lines as communication lines. In addition, the buses have 3-bit address lines each which are used to address the respective rows and columns (8 rows and 8 in this embodiment). The values transferred on these buses designate the layout addresses to provide a correspondence between the layout of the control/memory units and the processor units 12 in the processor section 10. Ready lines, and arbitration lines (3 bits) are provided to secure buses. Broadcast (BC) lines and busy lines are provided for broadcast instruction and data transfers. Consequently, each of the buses consists of a total of 56 lines of the column buses 48 and 52 lines of the row buses 50.

All the control/memory units 22 desirably have equal opportunity to secure the buses. Arbitration of the use of buses is accomplished by time sharing. Arbiters 52 and 54 cyclically output 3-bit numbers to the arbitration lines every time the ready signal changes from logic-high to logic-low. The maximum number on the arbitration lines is the number of units arranged in each row or column. The units in the same column (row) can secure buses by changing the ready signal from logic-low to logic-high when the number on the arbitration line coincides with the number (address) assigned to the unit. In response to this signal change, the arbiter stops providing values. If buses no longer need to be secured, the ready signal changes from logic-high to logic-low, causing the arbiter to resume providing values. The numbers on the column (row) arbitration lines are checked by a comparator 137 of the router 42 which compares the numbers to its own address which is always available from the control/memory unit.

Figure 4:
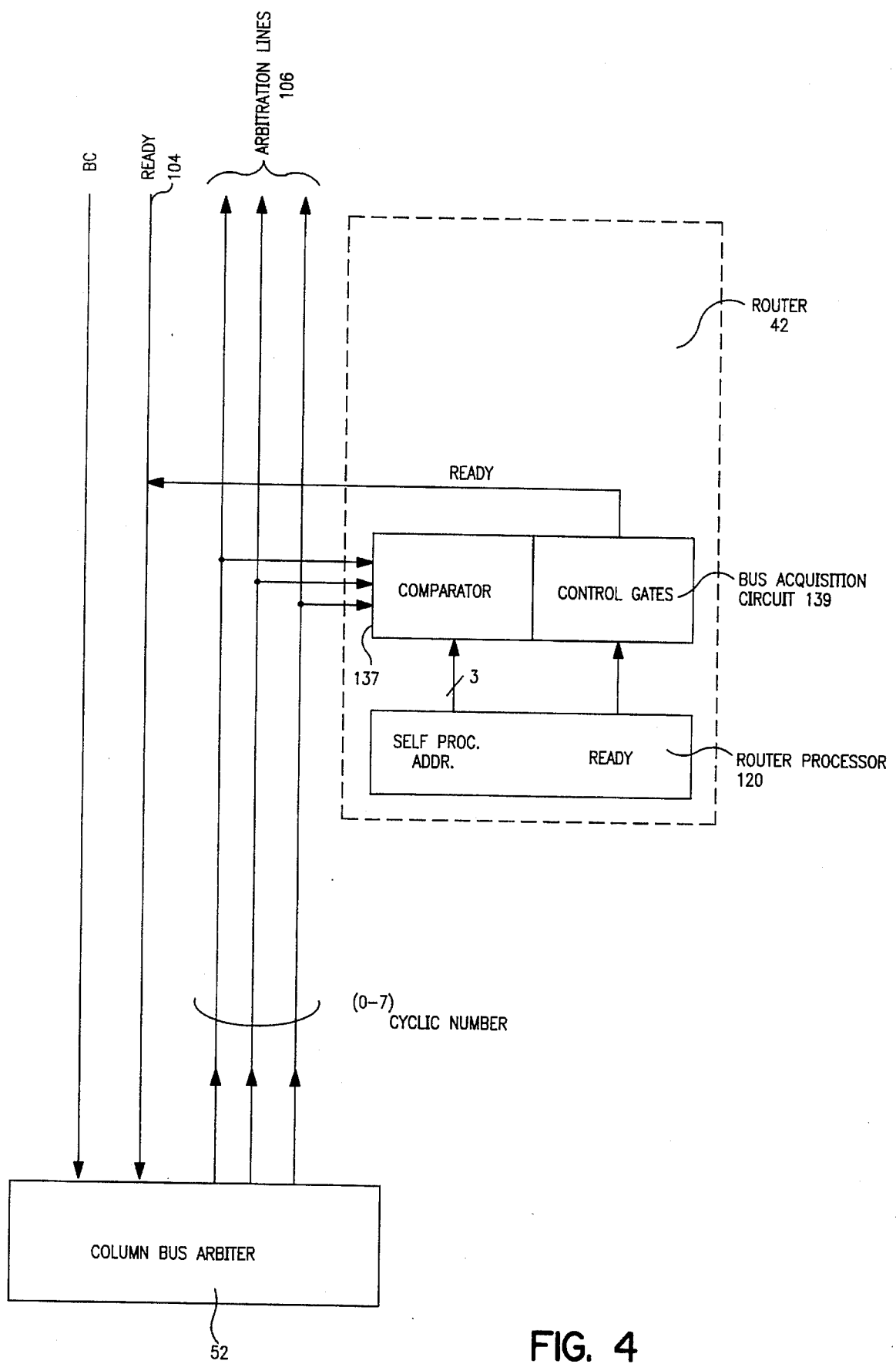
FIG. 4 is a logic diagram, partly in block diagram form, illustrating the router and the column bus arbiter shown in FIG. 2.

FIG. 4 shows part of the router 42 relating to the arbitration of the control/memory unit, and the column bus arbiter 52. The router 42 has a router processor 120 and a bus acquisition circuit 139 including the comparator and gates. The connection between the router 42 and the column bus arbiter 52 is effected by the aforementioned ready line 104 and arbitration lines 106. The router processor 120 provides an internally stored self address. The arbiter 52 cyclically provides sequential numbers 0–7 on the three-bit arbitration lines 106, and secures the right to use the buses when the number provided by the arbiter 52 matches its internally stored address.

Data transfer between the control/memory units located on different rows is, as a rule, carried out by first applying data to a column bus, and then switching the data from the column to the row. This routing of data to the column bus line and the switching of data to a row line are effected by the router 42 on each control/router chip. The ready line 104 is kept at logic-high so long as the router of the master unit secures the right to use the buses. When the Ready line 104 is logic-high the arbiter 52 discontinues the transmission of sequential numbers during the transfer interval.

Figure 5:
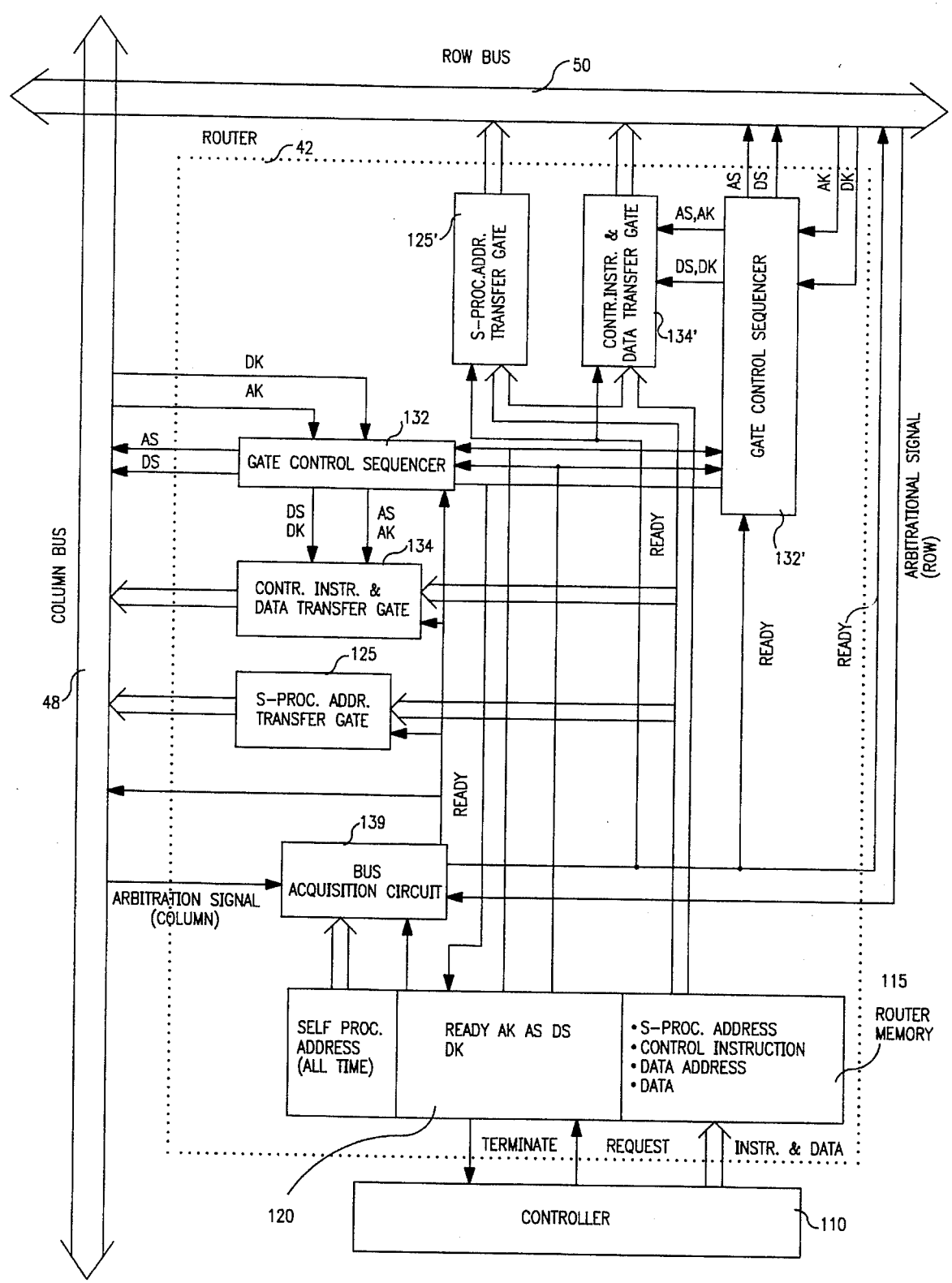
FIG. 5 is a logic diagram, partly in block diagram form, illustrating the function of the router shown in FIGS. 2 and 4 and useful for describing the algorithm for data transmission.

FIG. 5 is a diagram illustrating the router which is useful to explain the algorithm for data transmission. The controller 110 shown in the lowermost part of the figure corresponds to part of the controller 40 in FIG. 2. The router 42 includes the router processor 120, the bus acquisition circuit 139, a gate group (125, 134) for the column bus 48, a gate control sequencer 132 for the column bus 48, a gate group (125, 134) for the row bus 50, and a gate control sequencer 132 for the row bus 50. Bus acquisition for the row bus 50 is carried out by the bus acquisition circuit 139. In the following description, symbol "M" refers to "master," and "S" to "slave".

The AD (address and data) transmitted from the controller 110, which is stored in a router memory 115, contain a 22-bit wide address value. This address value includes a two-bit wide information value, indicating whether the transmitted data is Write or Read and whether it is a single data value transfer or block transfer, and an eight-bit wide information value as an instruction code. The instruction code determines how the data value which follows the address should be processed by the control unit.

The controller 110 requests the router processor 120 to secure buses by preparing, together with the data being transmitted, the address denoted as S-processor address written by S-row and S-column of the slave unit in the router memory 115. The slave unit is the control/memory unit on the receive side. The router processor 120 decides whether the data should be sent to the column bus 48 or to the row bus 50 by comparing its own address denoted as Self processor address (M-row) with S-row in the bus acquisition circuit 139. Once the bus to which the data are to be sent is decided, the router processor 120 waits until the signal of the arbitration line designates its own address, and sends a ready signal to the bus. This completes the securing of buses.

When the data is sent to the column bus 48, a ready signal is sent to the S-processor address transfer gate 125, the control instruction & data transfer gate 134 and the gate control sequencer 132. The address of the slave unit is first sent from the S-processor transfer gate 125, making communication between the master unit and the slave unit possible. Whether the address strobe (AS) signal or the data strobe (DS) signal is to be transmitted depends on an instruction given by the controller 110. Nonetheless, at this point the transmission algorithm checks for the transmission of addresses, and then data. The AS signal from the router processor 120 is sent to the AS line simultaneously with the S-processor address because the gates controlled by the read signal has already been opened. Upon sending the AS signal, the AD (address) is passed by the control instruction & data transfer gate 134 (which was opened by the AS signal from the sequencer 132). The Gate 134 for the AS signal is then closed by the address acknowledge (AK) signal returned from the slave unit, completing the transmission of the AS signal. Next, the slave unit recognizes the change in state of the AS signal and terminates the transmission of the AK signal. In the next step in the algorithm, the gate for passing the AD (address) is closed by the AK signal transferred from the sequencer 132, completing the transmission of the AD.

Immediately after the address has been sent, the gate for the DS signal in the sequencer 132 is opened to send the data strobe (DS) signal to the DS line and to the gate for the AD (data) in the transfer gate 134. Upon receipt of the data, the slave unit returns the data acknowledge (DK) signal. Thus, the gate for the DS closes, terminating the transmission. Recognizing the change in the DS signal, the slave unit terminates the transmission of the DK signal. Responsive to the change in state of the DK signal, the gate for the AD in the transfer gate 134 closes, terminating the transmission of the AD (data).

The transmission of data to the row bus 50 is executed similarly. In this case, however, the S-row of the slave address is not necessary.

Figure 6:
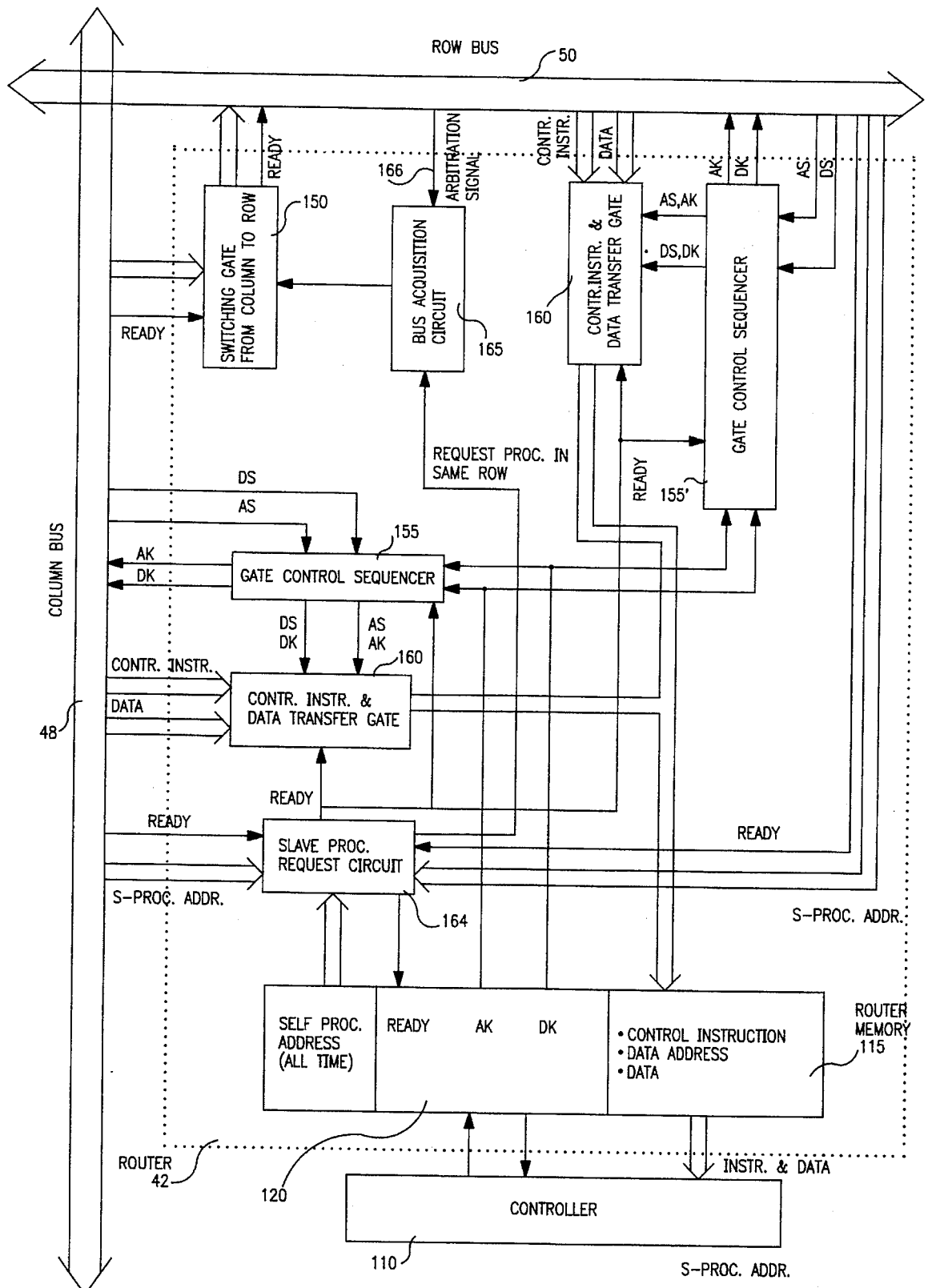
FIG. 6 is a logic diagram, partly in block diagram form, illustrating the function of the router shown in FIGS. 2 and 4 and useful for describing the algorithms for data receiving and switching from column buses to row buses.

FIG. 6 is a logic diagram which illustrates the function of the router to explain the algorithm for receiving data, and for switching from the column bus to the row bus. Like elements are indicated by like reference numerals and symbols used in FIG. 5.

First, the algorithm for switching from the column bus to the row bus is described. Since the column address line is always monitored by the router processor 120, judging logic circuitry (not shown) in a slave processor request circuit 164 detects a signal which indicates that a certain control/memory unit is attempting to gain access to a row address which matches the row address of the router 42. The slave processor request circuit 164 then immediately checks the column address. If the column address specified by the signal does not match the column address of the slave unit but the row addresses do match, the column bus signal is switched to the row bus. When a requesting signal for column/row switching from the slave processor request circuit 164 is detected, the interval in which the switch may be made is indicated by the row arbitration line signal 166. This signal enables the column to row switch through a bus acquisition circuit 165. The switch occurs when the column ready signal is switched to the row ready line via a switching gate 150. The switched row ready signal opens the gates in the switching gate 150 to transfer all of the information.

With this switching operations, the slave unit that has secured the column ready line and the row ready line can send the row bus information to the column bus. This function is necessary for the execution of the Read operation.

Now, the receiving of data is described with FIG. 5 representing the source of the requested data. When it is detected by the slave processor request circuit 164 STET that the slave address signal (S-ADD) addresses this slave processor, either the address strobe (AS) gate in the gate control sequencer 155 or the data strobe (DS) gate in the gate control sequencer 155 is opened by the input ready signal. Both signals are never received simultaneously. As the controller 110 identifies whether the signal is an address strobe (AS) signal or a data strobe (DS) signal, it prepares to receive the address (AD) of the data to be transferred. The data is received by opening the transmission gate in the control instruction & data transfer gate 160 by the AS or DS signal from the sequencer 155. As the address value AD is received, the router processor 120 returns an address acknowledge (AK) signal or a data acknowledge (DK) signal to the slave processor by a function of the sequencer 155. The transmission of the AK signal or the DK signal is continued until the AD is received.

The same applies to receiving data from the row bus, except that there is no need for the check of the column address.

Figure 7:
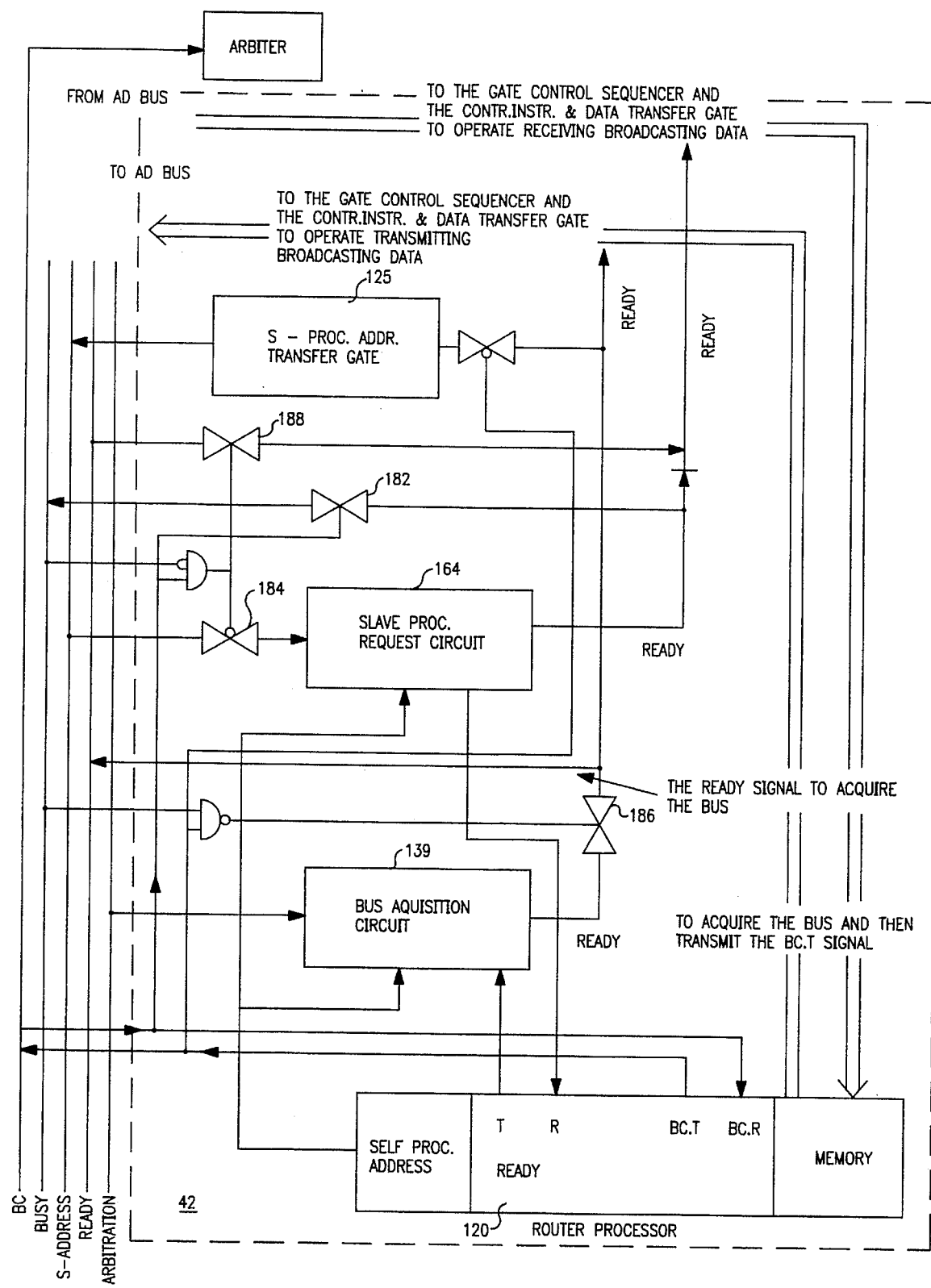
FIG. 7 is a logic diagram, partly in block diagram from which is useful for explaining the algorithm used for broadcasting in the system shown in FIG. 1.

In data transfer, it is desirable to be able to transfer the same data or instructions from one control/memory unit to all the other control/memory units, that is, to broadcast the data or instructions. The transferring of data from the host computer to the various slave processors is a typical example of broadcasting. FIG. 7 is a diagram which is useful for describing an exemplary algorithm for a broadcasting operation in the router, using a control/memory unit as the data transmission and receive source. Reference numeral 42 refers to the router of the control/memory unit. Numerals 120, 125, 139 and 164 show the same circuits as in FIGS. 5 and 6.

The column bus 48 has a broadcast (BC) signal line to indicate broadcasting, and a busy line for checking whether other control memory units are active. Since all the broadcasting information is input from the column bus, there is no BC line in the row bus. There is, however, a busy line in the row bus which is used to confirm that no data are being transferred on the row bus when broadcasting is requested. Column buses are connected to the peripheral bus and its connection are controlled by a BC signal.

The control/memory unit generates a BC signal to declare broadcasting. With this declaration, all the column-bus arbiters and row-bus arbiters are stopped. If the receiving units are still engaged in data transfer, the ready signal for these lines is transmitted to the busy line, opening a gate 182 by the received BC signal but continuing the operation of the data receive by accept of the S-address signal through a gate 184, and causing a gate 186 to close. As a result, the unit on the transmit side cannot provide data to the column bus. That is, the unit is busy.

When the receiving units have completed the data transfer which delayed the broadcast, the completion event is conveyed to the transmitting unit via the busy line. The transmitting unit obtains the right to use the column bus and issues a ready signal, in the same manner as described above. Thus, the output signals of the gates 182 of all the receiving units is changed are logic-low, causing the gate 186 to open and to send the ready signal to the column bus 48 (shown in FIG. 2), the gate control sequencer (not shown) and the control instruction & data transfer gate (not shown) in the transmitting unit. The algorithm for it is the same as the algorithm described above with reference to FIG. 5. On the other hand, the gate 184 is closed and the gate 188 is opened in the receiving units. Then, the ready signal is input through the gate 188, and transferred to the gate control sequencer and the control instruction & data transfer gate which operate to receive the data as shown in FIG. 6.

Figure 8:
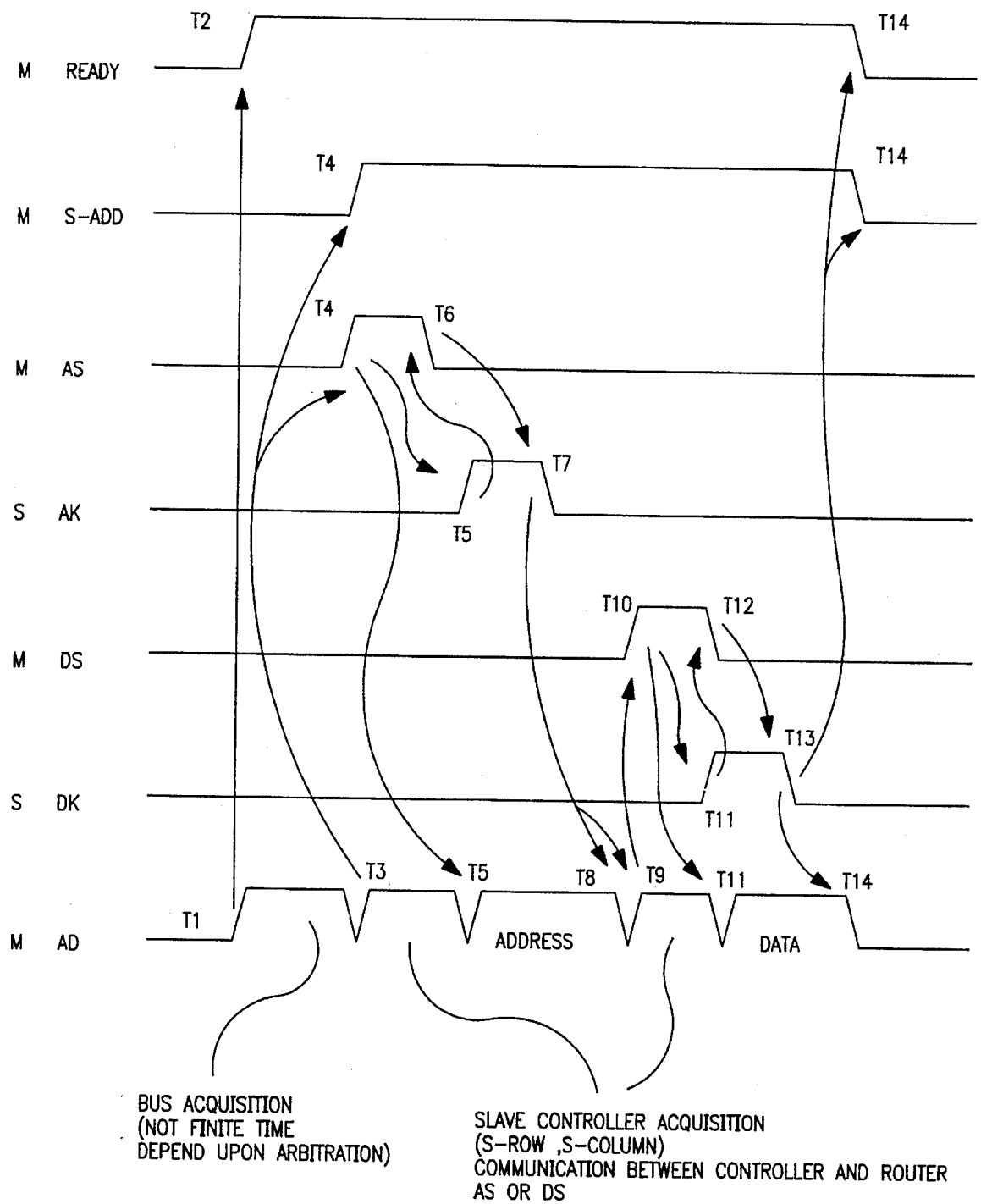
FIG. 8 is a timing diagram illustrating the signal timing of communication and AD lines, shown in FIGS. 5, 6 and 7, in the Write mode.

The timing of each operation as described above is described in the following, referring to the signal timing diagram of FIG. 8.

First, the Read and Write operations are explained. FIG. 8 is a timing chart which illustrates the signal timing of the communication line and the AD line when the master control/memory unit (M) writes an address and then data in the slave control/memory unit (S). As shown in FIGS. 5 and 8, the controller 110 of the master unit requests its router processor 120 to acquire the bus at time T1. The time interval for this bus acquisition operation is not fixed, but depends on arbitration. Upon securing the bus, the router, at time T2, sends a ready signal to the ready line. At time T3, the controller 110 immediately requests the router processor 120 to acquire a slave unit. The router processor, at time T4, sends the address of the slave using the six S-add lines (3 S-Row and 3 S-column), and simultaneously changes the AS signal to logic-high.

The designated slave unit, at time T5, receives the AS signal on the basis of the receive algorithm described above with reference to FIG. 6, and opens the AD receiving gate to send an AK signal to the master unit. In the AD signal (address), an R/W signal indicates whether the information is to be Read and Written. The AD signal also specifies how the received data is to be processed, i.e., instruction codes and address for writing in a memory (refer to FIG. 5).

Upon receipt of the AK signal from the slave unit at time T6, the master unit changes the AS signal to logic-low. The slave unit detects this at time T7 and changes the AK signal to logic-low. As address transfer is completed at time T8, the master unit resumes the slave controller acquisition operation, and at time T10, transmits the DS signal to send a 32-bit data value. The slave unit that has received the DS signal opens the gate to receive the data at time T11, and respond to the DS signal by changing the DK signal to logic-high. The slave unit then writes the data in the designated address in accordance with the instruction it received previously.

At time T12, upon receipt of the DK signal from the slave unit, the master unit changes the DS signal to logic-low. The slave unit detects this at time T13 and changes the DK signal to logic-low. Upon completion of data transfer at time T14, the master unit restores the ready signal and the S-add signal which the master unit has transmitted for the duration of the transfer operations.

Figure 9:
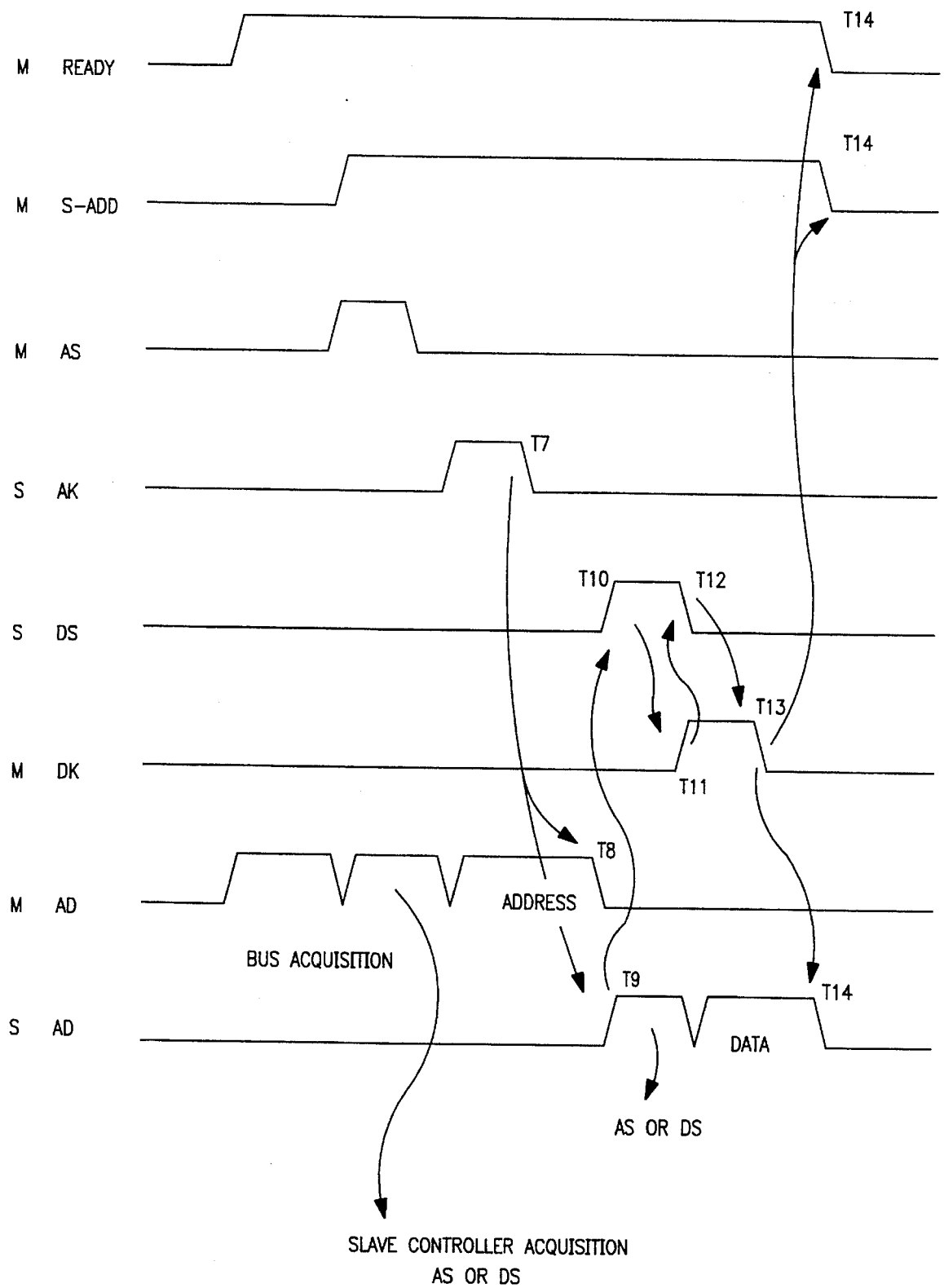
FIG. 9 is a timing diagram illustrating the signal timing of communication and AD lines, shown in FIGS. 5, 6 and 7, in the Read mode.

FIG. 9 is a timing chart showing the signal timing of the communication line and the AD line when the master unit reads data from the slave unit. In the Read mode the master unit transfers an address to the slave unit which contains the data being read in accordance with the algorithm for the sender (refer to FIG. 5), once connection has been made between the master and the slave, however, the master unit serves as the receiver and the slave unit as the sender (refer to FIG. 6). Consequently, only the signal timing for the actual data transfer is different from that of the Write mode. That is, the master unit's operations ranging from bus acquisition, slave-controller acquisition, and address transfer to the slave unit are the same as the description with reference to FIG. 8.

As shown in FIG. 9, after the receipt of the AD (address) at time T7, the slave unit changes the AK signal to logic-low, then activates the AD signal to initiate the master controller acquisition operation. At this time, the slave unit also changes the DS signal to logic-high. In other words, the slave unit becomes a sender. At time T11, as the master unit changes the DK signal to logic-high after the receipt of data, the slave unit, at time T12, changes the DS signal to logic-low. The master unit then detects the logic-low DS signal at time T13 and changes the DK signal to logic-low. Upon completion of data transfer from the slave unit at time T14, the master unit restores the ready signal and the S-add signal which the master unit has transmitted for the duration of the real operation.

Next, the Block Write and Block Read operations are described. In these operations, data are sent continuously. Block Write and Block Read can perform the block transfer of data by sending the block transfer message in the address data to the S unit.

Figure 10A:
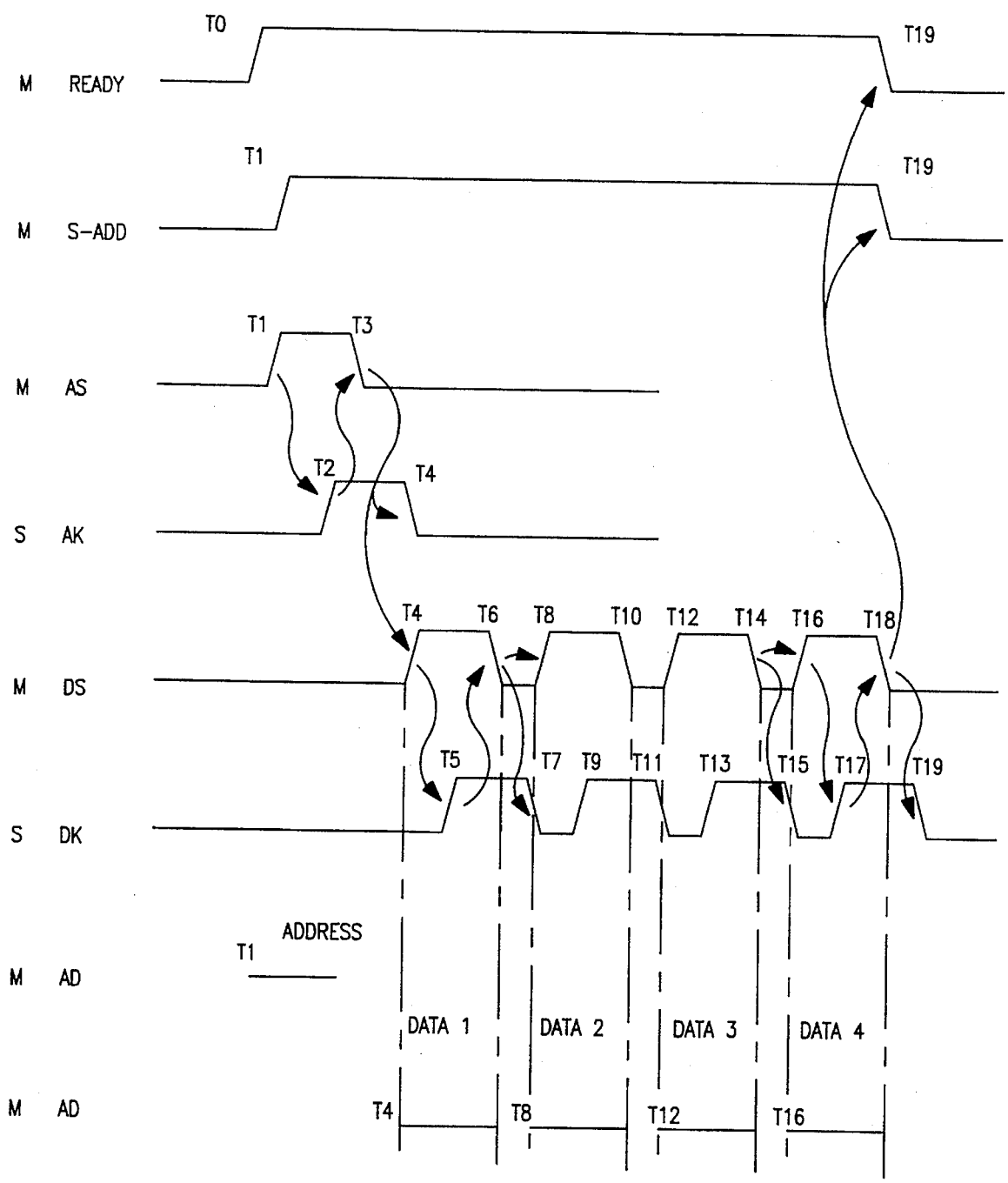
FIG. 10A is a timing diagram illustrating the signal timing of communication and AD lines, shown in FIGS. 5, 6 and 7, in the Block Write mode.

FIG. 10A shows the signal timing of the communication line and the AD line in the Block Write mode. The basic operation for Block Write is the same as that described in FIG. 8. Once the base address has been established at time T4, the master unit transmits Data 1, Data 2, Data 3 and Data 4 continuously to the slave unit by repeatedly switching the DS signal between logic-high (times T4, T8, T12 and T16) and logic-low (T6, T10, T14 and T18) states.

Figure 10B:
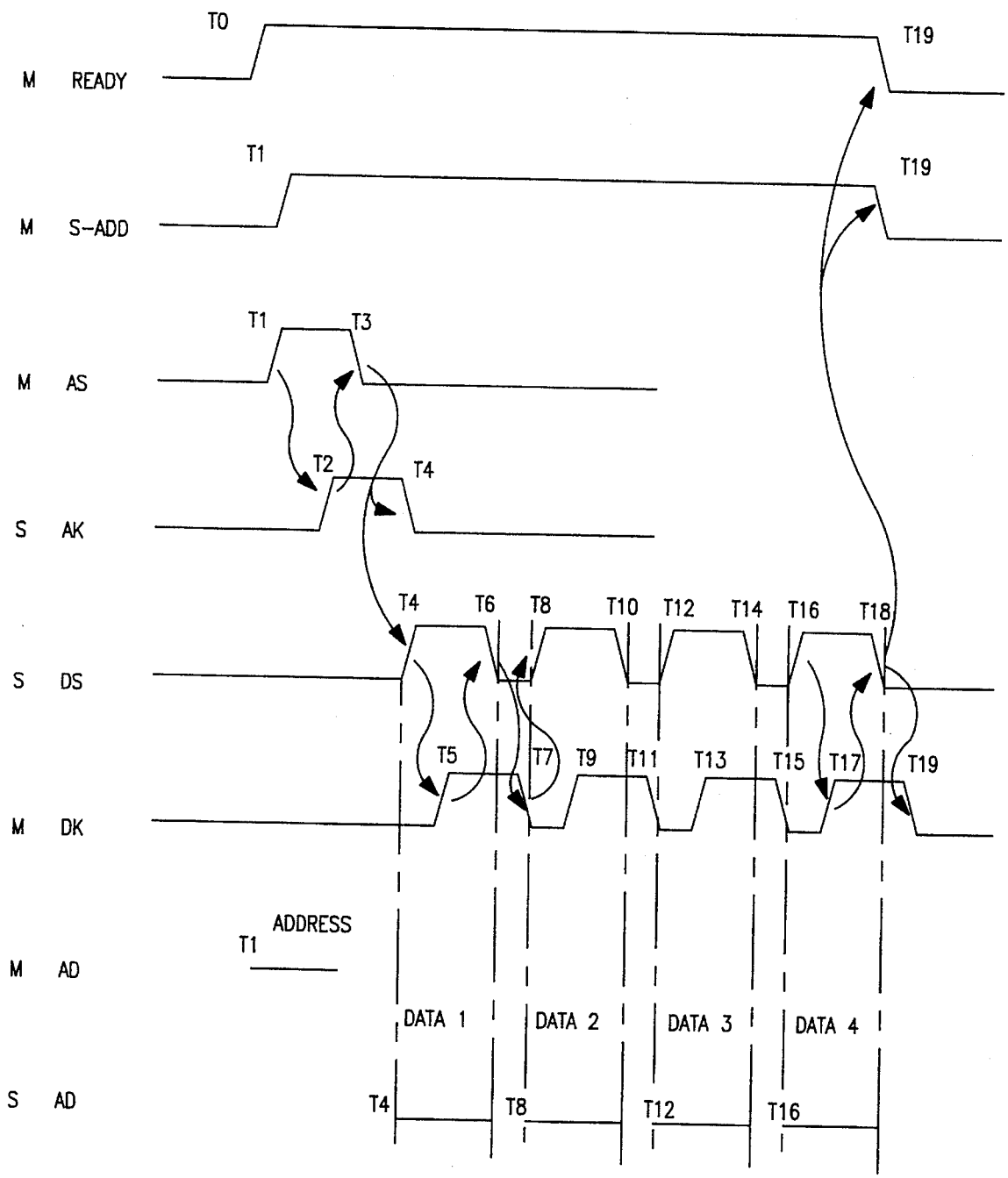
FIG. 10B is a timing diagram illustrating the signal timing of communication and AD lines, shown in FIGS. 5, 6 and 7, in the Block Read mode.

FIG. 10B shows the signal timing of the communication line and the AD line for the Block Read mode. The basic operation for Block Read is the same as that described in FIG. 9. Once the base address is established at time T4, the slave unit transmits Data 1, Data 2, Data 3 and Data 4 in sequence to the master unit by repeatedly switching the DS signal between logic-high (times T4, T8, T12 and T16) and logic-low (T6, T10, T14 and T18) states.

As described above, the communication between any two memory/control units (i.e. read, write, block read or block write) ties up only the row and column busses which are needed to effect that communication. Consequently, multiple communication operations may be in progress at any one time. In addition, if each control/memory unit and the processor unit to which it is optically coupled are considered as a set, multiple communication paths between different sets may be established and may operate concurrently.

The invention claimed is:

1. A bus structure for multiprocessor systems comprising a processor section which includes a plurality of processor units arranged in an array having a number of columns and a number of rows, and a control/memory section which includes a plurality of control/memory units arranged in an array and corresponding one-to-one to said plurality of processor units; said processor units and said corresponding control/memory units being optically connected; said bus structure for multiprocessor systems comprising:

a first instruction/data transfer bus structure interconnecting the plurality of processor units in said processor section, wherein the plurality of processor units are immediately adjacent, a second instruction/data transfer bus structure, different from the first instruction/data transfer bus structure, interconnecting the plurality of control/memory units in said control/memory section, wherein each one of the control/memory units is directly connected by the second instruction/data transfer bus structure to other control/memory units which are not immediately adjacent to the one control/memory unit, and a plurality of output channels for conveying a signal between said processor section and said control/memory section, wherein said first instruction/data transfer bus structure provides interconnection among a first group of said processor units including one processor unit and said second instruction/data transfer bus structure provides interconnection among the control/memory unit which corresponds to the one processor unit, and a group of said control/memory units to provide interconnection among the one processor unit and a second group of said processor units, which second group of processor units: a) corresponds to said group of control/memory units and b) is different from the first group of processor units.

2. A bus structure for multiprocessor systems as set forth in claim 1 wherein:

said first instruction/data transfer bus structure directly connects processor units which are adjacent to the one processor unit to form the first group of processor units, and said second instruction/data transfer bus structure connects said array of control/memory units in a grid form with row buses and column buses such that the control/memory units connected to at least one of the row busses and to at least one of the column busses, to which the one control/memory unit is connected, form the group of control/memory units, and the processor units corresponding to the group of control/memory units form the second group of processor units.

3. A bus structure for multiprocessor systems as set forth in claim 2 wherein:

said first instruction/data transfer bus structure is used to transfer instructions and data between adjacent ones of said plurality of processor units, and said second instruction/data bus structure is used to transfer instructions and data directly between ones of the control/memory units which include control/memory units other than the ones of the control/memory units which correspond to said adjacent processor units.

4. A bus structure for multiprocessor systems as set forth in claim 3 wherein:

each processor unit in the first group of processor units has a respective buffer; and the buffers are configured to allow data which is stored, using said first instruction/data transfer bus structure, at a particular buffer address in the buffer of a selected ones of said processor units to be simultaneously stored in a predetermined address in the buffer of one of said plurality of processor units which is adjacent to said selected processor unit.

5. A bus structure for multiprocessor systems as set forth in claim 4 wherein each of the processor units in the first group of processor units is configured to read data in an arbitrary address in the buffer belonging to each other processor unit in the first group of processor units, and to write data in a predetermined address of each other processor unit in the first group of processor units.

6. A bus structure for multiprocessor systems as set forth in claim 2 wherein said second instruction/data transfer bus structure is configured to allow a plurality of the control/memory units to be concurrently used to perform write, read, block write and block read operations.

7. A bus structure for multiprocessor systems as set forth in claim 2 wherein said second instruction/data transfer bus structure is configured to allow instructions and data to be simultaneously transferred from one instruction/data source, including a host computer, to all of said plurality of control/memory units.

8. A bus structure for multiprocessor systems as set forth in claim 2 wherein a bus arbitration function allows each of said control/memory units in the group of control/memory units equal opportunity to gain access to ones of said row buses and said column buses to which the control/memory units in the group of control/memory units are coupled.

9. A bus structure for multiprocessor systems as set forth in claim 2 further including circuitry for switching the information sent via ones of said column buses to ones of said row buses with equal priority.

10. A bus structure for multiprocessor systems as set forth in claim 2 wherein:

said plurality of output channels is equal, in number, to the number of columns of said array of processor units;

said output channels are connected to of said control/memory units which correspond in position to said output channels; and said plurality of processor units are connected in parallel with said plurality of control/memory units via said column buses.

11. A bus structure for multiprocessor systems as set forth in claim 2 wherein:

said plurality of output channels is equal, in number, to the number of rows of said array of processor units;

said output channels are connected to of said control/memory units which correspond in position to said output channels; and said plurality of processor units are connected in parallel with said plurality of control/memory units via said row buses.

12. A bus structure for multiprocessor systems as set forth in claim 1 wherein:

corresponding ones of said plurality of processor units and said plurality of control/memory units are combined into respective sets; and each set is configured to receive instructions and data from an arbitrary one of said plurality of control/memory units.

13. A bus structure for multiprocessor systems as set forth in claim 1 wherein:

corresponding ones of said processor units and said control/memory units are formed into pairs;

and at least one of said control/memory units includes a function which causes an arbitrary processor unit to provide data to a control/memory unit which forms a pair with another one of the processor units, and causes an arithmetic operation to be executed on the provided data by said other processor unit.

14. A bus structure for multiprocessor systems comprising a processor section which includes a plurality of processor units arranged in an array, and a control/memory section which includes a plurality of control/memory units arranged in an array and corresponding one-to-one to said plurality of processor units; said processor units and said corresponding control/memory units being optically connected; said bus structure for multiprocessor systems comprising:

a first instruction/data transfer bus structure which directly interconnects a first group of the processor units in said processor section, wherein the first group of the processor units are immediately adjacent; and a second instruction/data transfer bus structure, different from the first instruction/data transfer bus structure, which indirectly interconnects a second group of the processor units in said processor section, different from the first group, via direct connections among corresponding control/memory units said second group of the processor units including processor units which are not immediately adjacent.

* * * * *

UNITED STATES PATENT AND TRADE MARK OFFICE
CERTIFICATE OF CORRECTION

PATENT NO. : 5,581,767
DATED : December 3, 1996
INVENTOR(S) : Katsuki et al.

It is certified that error appears in the above-identified patent and that said Letters Patent is hereby corrected as shown below:

Column 7, line 34, insert the word "total" between "a" and "of".

Column 11, line 55, insert the word "columns" between "8" and "in"

Column 18, line 21, insert the word "ones" between "to" and "of".

Signed and Sealed this

Twenty-ninth Day of July, 1997

*Attest:*

BRUCE LEHMAN

*Attesting Officer*   *Commissioner of Patents and Trademarks*